United States Patent [19]

Behnk et al.

[11] Patent Number: 4,811,461
[45] Date of Patent: Mar. 14, 1989

[54] APPARATUS FOR MECHANICALLY PROCESSING FISH OF THE TRACHURUS SPECIES

[75] Inventors: Günter Behnk, Reinfeld; Dieter Nüske, Stockelsdorf, both of Fed. Rep. of Germany

[73] Assignee: Nordischer Maschinenbau Rud. Badder GmbH & Co. Kg, Lubeck, Fed. Rep. of Germany

[21] Appl. No.: 175,750

[22] Filed: Mar. 31, 1988

[30] Foreign Application Priority Data

Apr. 1, 1987 [DE] Fed. Rep. of Germany ....... 3710851

[51] Int. Cl.4 .............................................. A22C 25/16
[52] U.S. Cl. ..................................................... 17/56
[58] Field of Search ............................................ 17/56

[56] References Cited

U.S. PATENT DOCUMENTS

| 3,309,730 | 3/1967 | Michael | 17/56 X |
| 4,365,387 | 12/1982 | Hartmann et al. | 17/56 X |
| 4,442,569 | 4/1984 | Brower et al. | 17/56 X |
| 4,484,375 | 11/1984 | Brower | 17/56 |
| 4,485,525 | 12/1984 | Behnk et al. | 17/56 X |

Primary Examiner—Willie G. Abercrombie
Attorney, Agent, or Firm—Thomas R. Morrison

[57] ABSTRACT

The invention relates to a method for processing fish of the Trachurus species and an apparatus for performing the method.

In order to obtain top quality products of this fish type and which a high yield, there is provided a tool for removing the bony structure at the end of the abdominal cavity which is prejudicial to precise processing. The tool comprises two circular knives acting as abdomen openers and in whose gap where is arranged a guide member with a sharp leading edge and covering the upper rear area of the cutting edges, which guide member removes the fin ray support (pterygophore) of the anal fin overlappingly connected to the first belly spoke (haemapophyses of the eleventh vertebra) together with the anal fin and the abdomen edge, so that no bearing or rearing up of the tail area impeding the separation of the lateral keeled scales, in particular, occurs.

4 Claims, 2 Drawing Sheets

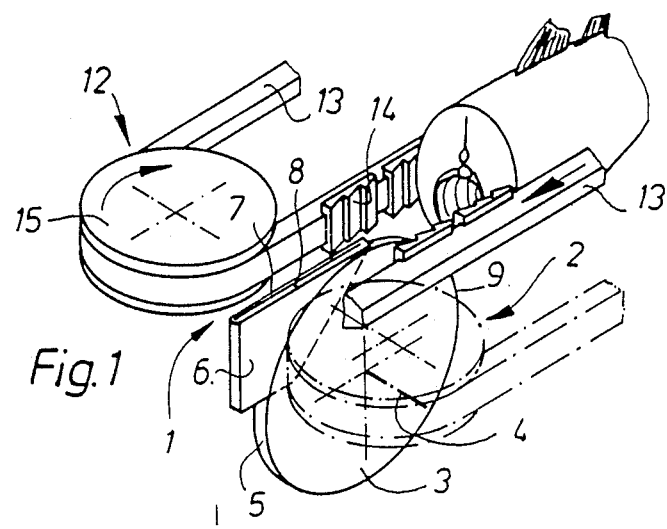
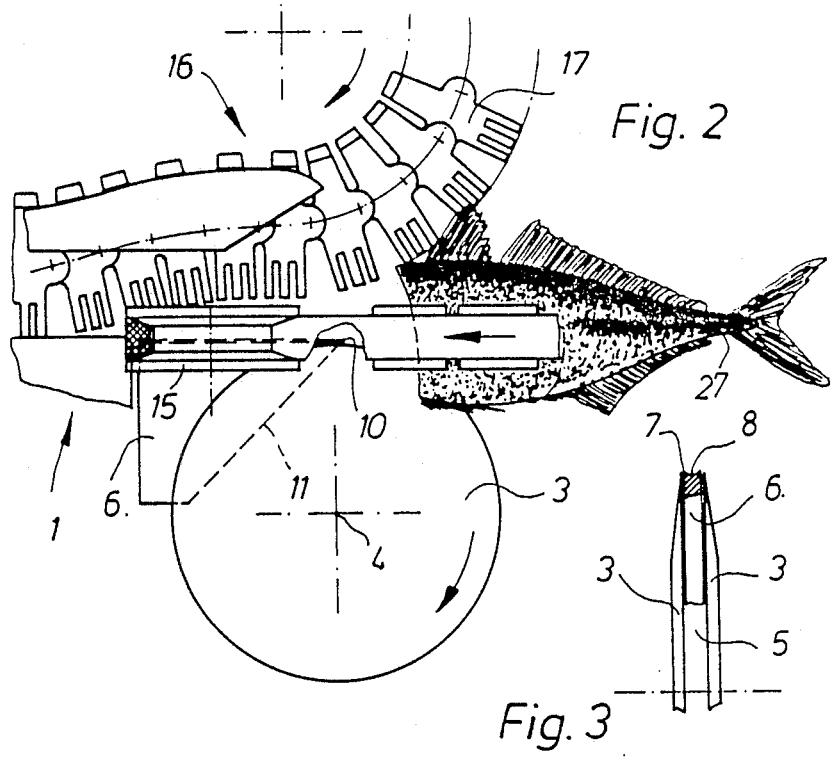

APPARATUS FOR MECHANICALLY PROCESSING FISH OF THE TRACHURUS SPECIES

BACKGROUND OF THE INVENTION

1. Field of the Invention

The invention relates to an apparatus for the mechanical processing of fish of the Trachurus species for the purpose of obtaining fillets or an intermediate product, e.g. suitable for frying purposes, in the form of a headless, abdominally opened and gutted fish body freed from lateral keeled (shield or buckler) scales, the apparatus comprising a conveyor conveying the decapitated fish in the swimming direction along a guideway; a tool for opening the abdominal cavity, including two circular knives arranged symmetrically to the guideway while forming a gap between them; and, if necessary, filleting tools of known construction.

2. Prior Art

The basic aim in the mechanical processing of fish is to achieve a, as high as possible, degree of utilization with the maximum commercial profit. For this purpose, processing must take place with high precision, so that, in the case of the most economical cutting performance, it is safeguarded that the product to be produced is free from quality-decreasing components. In the case of fish of the Trachurus species, which in the different regions of world waters occur in varying appearances and, among others, are known, for example, as scad, horse mackerel or the like, such components consist of the keeled scales located on the body flanks in the tail area, which scales are inconvenient in the gaining of fillets and other products. Therefore it is attempted to remove these keeled scales in order to permit trouble-free processing. However, difficulties are encountered in removing the keeled scales in that the spindle-shaped tail part must be guided very precisely during such processing, in order to achieve a qualitatively satisfactory and economical separation. The desired result can be ahieved very reliably if, during this processing step, the fish body can be guided in its abdominal cavity while the lower side of its vertebral column is being supported. The prerequisite for this is, in first place, the opening of the abdominal cavity, but it has been found that in the case of fish of the Trachurus species the hard or tough structure present at the end of the abdominal cavity in the region of the anus in the form of a fin ray support (pterygophore) supporting the anal fin effects that in the case of such an abdominal cavity guidance the tail part of the fish to be processed is formed in an upward direction over said hard structure, so that it is not possible to process this region, at least not whilst obtaining the desired quality.

From DE-OS No. 14 54 074 a method for processing fish in the region of the abdominal cavity end is known. The object of this method is to process the abdominal cavity end of so-called gadide-type fish formed as a rearwardly extending pocket in such a way that said area receives a configuration continually approaching the edge of the belly towards the tail end. It is intended to ensure through this that spear-shaped guide elements, or, in general terms, elements engaging in the abdominal cavity, do not get stuck in the area of the end of the latter when conveying the fish in the swimming position.

3. Object of the Invention

The object of the present invention is to suggest an apparatus permitting the processing of the region of the abdominal cavity end, particularly in the case of fish of the Trachurus trachurus species or of fish with a similar abdominal cavity end area structure, without yield loss in such a way that on conveying the same in the swimming position, it is possible to guide them precisely by guide elements engaging in the abdominal cavity.

SUMMARY OF THE INVENTION

According to the invention, this object is achieved by an apparatus, which is characterized in that between the two circular knives of the tool for opening the abdominal cavity and namely in their area behind the active part of the cutting edges, there is provided a frame-fixed guide member filling the gap, having an upper edge, forming part of the guideway and having a leading edge directed counter to the fish conveying direction in the region of the culmination point of the cutting edges.

The advantages attainable with the invention reside, in particular, in that the hard structure composed of the first belly spoke (haemapophyses of the eleventh vertebra) located at the end of the abdominal cavity and of the fin ray support (pterygophore) of the anal fin is virtually softened by splitting off the latter from said belly spoke, so that, consequently, the said spoke as well as the following ones can be bent towards the tail end as a result of the friction against the guideway.

To prevent the circular knives from cutting into the vertebrae of the vertebral column the guide member is arranged in such a way that its upper edge projects slightly over the cutting edges of the circular knives at the culmination point thereof and, for improving the guidance function of the guide member, its upper edge is provided with a channel.

Due to the fact that the leading edge of the guide member passes into a deflector surface, which forms an acute angle with the upper edge thereof, it is attained that the cut-free abdominal seam, together with the anal fin and associated fin ray support is removed as an abdominal strip from the guideway and discharged, the tearing-off of the seam occurring in the region of the end of the cuts because the leading edge of the guide member is sharp.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a view of the tool according to the invention for opening the abdominal cavity in the form of a section of a fish processing machine in axonometric representation;

FIG. 2 shows a side view of the apparatus according to FIG. 1 with an allusive representation of the main conveyor;

FIG. 3 shows a cross-section through the tool according to the invention; and

DETAILED DESCRIPTION OF THE PREFERRED EMBODIMENT

Figure 4:
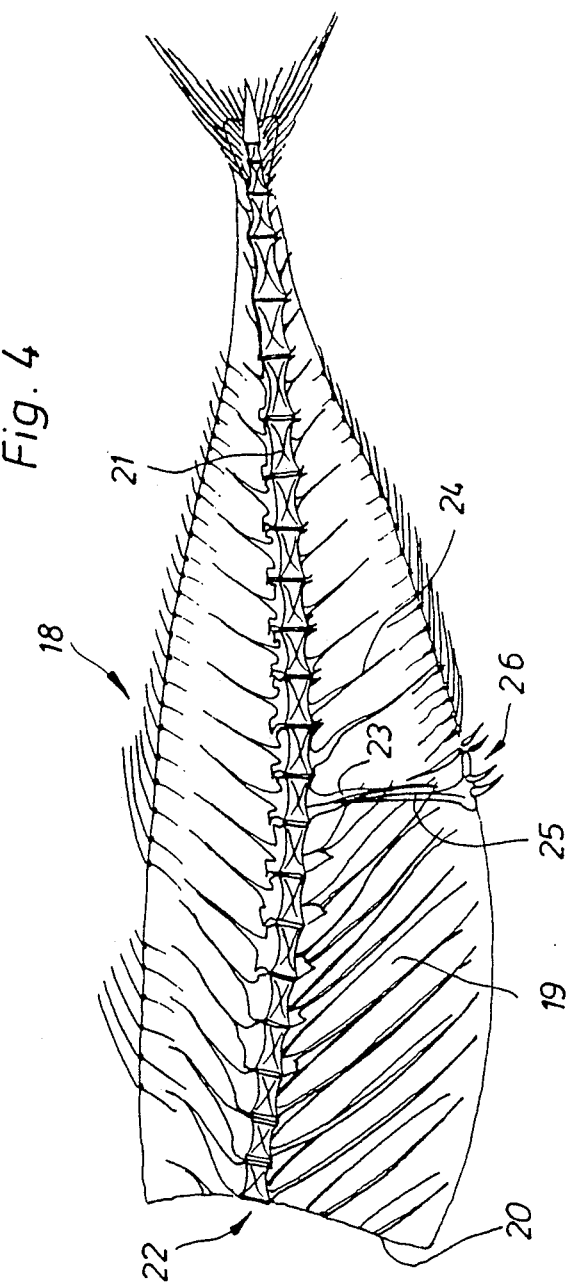
FIG. 4 shows the skeleton of a fish of the Trachurus species.

The invention is described hereinafter relative to the drawing on the basis of the construction and operation of the represented apparatus.

In a not shown frame of a fish processing machine, e.g. a filletting machine, there is arranged a guideway 1 supporting and aligning the fish and in whose entrance region there is provided a tool 2 for opening the abdominal cavity of the fish, which has two circular knives 3 fixed to a shaft 4. The circular knives 3 are driven to rotate clockwise and in vertical planes in a suitable manner and are arranged on their shaft 4 to form a gap 5 symmetrically to the guideway 1. A guide member 6 fills the upper part of the gap 5 located to the rear in the conveying direction, which guide member 6, with its upper edge 7 provided with a channel 8, projects slightly over the culmination point of the cutting edges 9 of the circular knives 3 and forms part of the guideway 1. The guide member 6, with its sharp leading edge 10, is directed against the arriving fish and, with its deflector surface 11 extending downwards from the leading edge, forms an acute angel, whose apex is the leading edge 10 of the guide member 6. In the region of tool 2, the machine is provided with a supply conveyor 12 engaging the fish to be processed by their flanks so as to convey the same, which conveyor 12 is in the form of belts 13 equipped with entrainers 14, the belts being deflected laterally out of the guideway immediately behind the tools 2 by means of deflection disks 15. In this area, a conveyor 16, introduced from above between the belts 13 of the supply conveyor 12 and revolving in the plane of the circular knives 3, takes over the conveying of the fish, in that its entrainers 17 engage with prismatic recesses in the backs thereof.

The function of the apparatus is as follows:

A fish body 18, for example, arriving from the decapitating section of a heading and filletting machine, enters in an appropriate manner between the belts 13 of the supply conveyor 12, which supplies it in the swimming position to the tool 2 for opening the abdominal cavity 19. Whilst the circular knives 3 cut on either side of the edge of the abdomen and therefore start to open the abdominal cavity 19, the leading rump surface 20 reaches the guide member 6, which penetrates into the abdominal cavity 19. The back of the fish body 18 simultaneously comes into contact with the entrainers 17 of the conveyor 16 lowering in this area into the guideway 1. As a result of the vertical alignment of the contour of the entrainers 14 seizing the fish body 18, the latter increasingly evades in the downward direction until the lower edges of the vertebrae 21 of the spinal column 22 rest on the upper edge 7 of the guide member 6. During further conveying, the leading edge 10 of the guide member 6 at the end of the abdominal cavity 19 meets the first one 23 of the belly spokes 24 (haemapophyses of the eleventh vertebra) or the fin ray support 25 (pterygophore) of the anal fin 26 overlappingly connected thereto by connective tissue. The fish body 18 attempts to evade the increasing resistance by forcing the leading edge 10 of the frame-fixed guide member 6 back towards the abdomen edge, i.e. by uprighting its tail part. However, this is counteracted by the conveyor 16, so that the resistance forces finally become so large that the connective tissue between the belly spoke 23 and the fin ray support 25 is destroyed. The releasing fin ray support 25, during its sliding down from the first belly spoke 23 acts as a pad such that said spoke is not sheared but, like the following spokes, is bent, a certain resiliency thereof effecting that the tail part of the fish body 18 is forced against the conveyor 16. As a result thereof the circular knives 3 emerge from the abdominal cavity 19 approximately in the region of the anal fin 26, the sharp leading edge 10 of the guide member 6 ensuring that the cut free abdominal strip comprising the abdominal edge, the anal opening and the anal fin with its fin ray support 25 is sheared in the region of the anal fin. The said abdominal strip is forced out of the machine via the deflecting surface 11. A problem-free further processing and in particular the separation of the lateral keeled scales 27 is now possible.

What is claimed is:

1. An apparatus for mechanically processing decapitated fish, which fish have a head end and a tail end defining a swimming direction of said fish, an abdominal cavity extending from said head end towards said tail end ending in an anal region, said fish having been decapitated, abdominally opened and gutted, the apparatus comprising
   a. a guideway;
   b. conveyor means for conveying said decapitated fish in said swimming direction along said guideway;
   c. a tool for opening said abdominal cavity, including two circular knives arranged symmetrically with respect to said guideway, defining cutting edges with an active part with regard to said fish and forming a gap between them;
   d. a guide member fixedly arranged between said two circular knives in an area downstream of said active part of said cutting edges;
   e. said guide member substantially filling a lateral dimension of said gap;
   f. said guide member including an upper edge forming at least a part of said guideway;
   g. said guide member including a leading edge directed counter to said fish conveying direction in the region of the culmination point of said cutting edges;
   h. said leading edge being sharp;
   i. a deflector surface on said guide member contiguous to said leading edge;
   j. said deflector surface leading away from said leading edge at an angle to provide an included angle between said upper part and said deflector surface of substantially less than 90 degrees.

2. An apparatus as claimed in claim 1, wherein said upper edge of said guide member projects slightly over said cutting edges at the culmination point thereof.

3. An apparatus as claimed in claim 1, wherein said upper edge of said guide member is provided with a channel.

4. An apparatus as claimed in claim 2, wherein said upper edge of said gude member is provided with a channel.

* * * * *